United States Patent
De Silva et al.

(10) Patent No.: US 12,265,531 B2
(45) Date of Patent: Apr. 1, 2025

(54) LIGHTWEIGHT GRAPH DATABASE AND SEARCHABLE DATASTORE

(71) Applicant: Target Brands, Inc., Minneapolis, MN (US)

(72) Inventors: Ian Joel De Silva, Minneapolis, MN (US); Blake Killian Wasung, Maple Grove, MN (US); Michael Hughes Neubert, Lakeville, MN (US); Ashlee Janet Suzanne Regan, Chaska, MN (US); Michael John Boldischar, Lino Lakes, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/307,481

(22) Filed: May 4, 2021

(65) Prior Publication Data

US 2022/0358126 A1 Nov. 10, 2022

(51) Int. Cl.
*G06F 16/22* (2019.01)
*G06F 16/2452* (2019.01)
*G06F 16/28* (2019.01)

(52) U.S. Cl.
CPC .... *G06F 16/24526* (2019.01); *G06F 16/2272* (2019.01); *G06F 16/288* (2019.01)

(58) Field of Classification Search
CPC .......... G06F 16/24526; G06F 16/2272; G06F 16/288; G06F 16/71; G06F 16/7328;
(Continued)

(56) References Cited

U.S. PATENT DOCUMENTS 8,185,558 B1 5/2012 Narayanan et al.
8,244,772 B2 8/2012 Aasman et al.
(Continued)

FOREIGN PATENT DOCUMENTS

WO 2017011717 A1 1/2017

OTHER PUBLICATIONS

Laptrinhx, NoSQL Polyglot Persistence: Tools and Integrations with Neo4j, https://laptrinhx.com/nosql-polyglot-persistence-tools-and-integrations-with-neo4j-4050218745/, 31 pages, retrieved Feb. 15, 2021.
(Continued)

*Primary Examiner* — Ajay M Bhatia
*Assistant Examiner* — Berhanu Mitiku
(74) *Attorney, Agent, or Firm* — Theodore M. Magee; Westman, Champlin & Koehler, P.A.

(57) ABSTRACT

A computer-implemented method includes receiving a message comprising an origin, a destination and a relationship type for a relationship between the origin and the destination. The message further includes a payload. A first node is created in a graph database for the origin and a second node is created in the graph database for the destination. A relationship is set between the first node and the second node in the graph database based on the relationship type. A node is created in the graph database for the message while preventing the payload from being stored in the graph database. A relationship is created between the first node and the node for the message. The message, including the payload, is stored in a searchable datastore separate from the graph database.

10 Claims, 14 Drawing Sheets

(58) Field of Classification Search
CPC .... G06F 16/732; G06F 16/75; G06F 16/8365;
G06F 16/8358; G06F 16/838; G06F
16/86; G06F 16/906; G06F 16/9024;
G06F 16/367; G06F 16/22; G06F 16/951;
G06F 16/382; G06F 16/93; G06F 16/176;
G06F 16/9538; G06F 16/285; G06F
16/178; G06F 16/1873; G06F 16/313;
G06F 16/903; G06F 16/278; G06F
16/9537; G06F 16/2453
See application file for complete search history.

(56) References Cited

U.S. PATENT DOCUMENTS

| | | | |
|---|---|---|---|
| 8,725,754 B2 | 5/2014 | Gopalakrishnan | |
| 9,092,548 B2 | 7/2015 | Morsi et al. | |
| 9,378,303 B1 | 6/2016 | Shankar et al. | |
| 9,577,975 B2 | 2/2017 | Tseng | |
| 10,061,805 B2 | 8/2018 | Tidwell et al. | |
| 10,540,345 B2 | 1/2020 | Huang et al. | |
| 2012/0096002 A1 | 4/2012 | Sheehan et al. | |
| 2014/0365531 A1* | 12/2014 | Soundararajan | G06F 16/28 707/798 |
| 2014/0365553 A1* | 12/2014 | Belmonte | G06V 30/416 709/202 |
| 2015/0370841 A1* | 12/2015 | Steigerwald | H04L 67/5683 707/741 |
| 2017/0221240 A1* | 8/2017 | Stetson | G06T 11/206 |
| 2018/0239810 A1 | 8/2018 | Pruitt et al. | |
| 2018/0336235 A1 | 11/2018 | Pena Munoz et al. | |
| 2019/0347340 A1* | 11/2019 | Wilczynski | G06F 16/248 |
| 2020/0153785 A1* | 5/2020 | Fulton | G06F 16/214 707/741 |
| 2020/0159753 A1* | 5/2020 | Lee | G06N 5/046 |
| 2022/0207003 A1* | 6/2022 | Khan et al. | H04L 45/745 |

OTHER PUBLICATIONS

May, A Logic-Based Approach to XML Data Integration, Technical Report, http://xml.coverpages.org/lopix-report.pdf, pp. 5-254, Mar. 11, 2020.

Win, NextDB: A Native XML Database System, https://dr.ntu.edu.sg/bitstream/10356/2671/1/SCE-THESES_94.pdf, 156 pages, 2005.

* cited by examiner

```
{
    "namespace": "Document Namespace",
    "class": "Document Class (<source><version>Doc)",
    "id": "Document ID",
    "display_name": "Display Name for the Document",
    "create_timestamp": "Example: 2018-10-02T10:30:00Z
    (optional)",
    "update_timestamp": "Example: 2019-01-01T12:10:30Z
    (optional)",
    "type": "Doc(optional)",
    "state": "active, or inactive",
    "data": {
    // Document data
    },
    "relationships": [
        {
            "origin": {
                "namespace": "Namespace of the Value Node",
                "class": "class of the Value Node",
                "id": "ID of Value Node"
            },
            "destination": {
                "namespace": "Namespace of the Value Node",
                "class": "class of the Value Node",
                "id": "ID of Value Node"
            },
            "type": "relationship type"
        }
    ]
}
```

Labels: 304 (namespace), 306 (class), 308 (id), 310 (display_name), 312 (type), 314 (state), 302 (data), 316 (relationships), 322 (origin), 330 (namespace), 332 (class), 334 (id), 318 (destination), 324 (namespace), 326 (class), 328 (id), 320 (type), 300

FIG. 3

LIGHTWEIGHT GRAPH DATABASE AND SEARCHABLE DATASTORE

BACKGROUND

Graph databases store entities and explicit connections between entities to thereby reduce the latency in tracing connections between entities. In particular, graph databases are efficient at returning all entities that are connected to a single entity even when those entities are connected through different relationship types. In addition, graph databases are efficient at identifying entities that are connected to an entity through one or more intervening entities.

In a graph database, an origin node representing one entity is connected to a destination node representing another entity through a relationship having a relationship type. Properties of the entity can be stored within the entity's node using a key:value representation. However, adding properties to nodes impacts the scalability of the graph database. In particular, as more properties are added to entity nodes, the size of the graph database increases. In addition, including properties within the nodes increases the amount of time needed to search for nodes having certain properties since the graph database must be traversed and each node examined to determine if the node contains the property. To avoid this, some implementations of the graph database represent certain properties as nodes in the graph and establish connections between those property-based nodes and the entity nodes that contain those properties. Such implementations exponentially increase the size of the graph database and negatively impact the speed at which the graph database can be traversed.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving a message comprising an origin, a destination and a relationship type for a relationship between the origin and the destination. The message further includes a payload. A first node is created in a graph database for the origin and a second node is created in the graph database for the destination. A relationship is set between the first node and the second node in the graph database based on the relationship type. A node is created in the graph database for the message while preventing the payload from being stored in the graph database. A relationship is created between the first node and the node for the message. The message, including the payload, is stored in a searchable datastore separate from the graph database.

In accordance with a further embodiment, a computer-implemented method includes receiving a message comprising a relationship and a payload, the relationship having an origin and a destination and the payload providing data related to one of a document and an event. A graph database is modified as necessary such that the graph database includes a node for the origin and a node for the destination. The graph database is modified as necessary so that the graph database includes a node for the document or event of the payload and so that the graph database includes a relationship between the node for the document or event and the node for the origin such that the node document or event can be found from the origin node.

In accordance with a still further embodiment, a system includes a lightweight graph database having nodes and relationships between nodes. The nodes include a node representing a document described in a message, the message having at least one element that provides a unique identifier for the document and a payload. The node representing the document is identified by the unique identifier and the payload of the message is excluded from the lightweight graph database. The nodes also include a node representing a destination in the message. The lightweight graph database includes a relationship between the node representing the document and the node representing the destination. The system further includes a datastore containing the message including the payload.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is an example of a document message.

DETAILED DESCRIPTION

Embodiments described below provided an improvement to computers and an improvement to database technology. In particular, the embodiments receive incoming messages that each define at least one relationship and have a data payload describing a document or event. The relationships defined in the message are used to create a lightweight graph database consisting of nodes connected by edges. In addition, a node is created for the document or event described by the payload and an edge is created to connect the node for the document/event to a node defined in the relationship section of the message. The data payload is stored in a searchable datastore that can be searched using an index search engine. The number of nodes added to the graph database and the number of properties for each node are limited to keep the graph database as small as possible.

By providing both a lightweight graph database and a searchable datastore, the invention prevents the graph database from becoming excessively large thereby allowing faster searches of relationships between entities while also allowing the full data payload to be searchable through the datastore. In addition, by including a node for the document/event in the graph database, the payload that provided a particular node in the graph can be quickly identified and retrieved from the datastore. As a result, users are able to use the lightweight graph database to identify entities of interest based on their connection to one or more known entities while also allowing the user to obtain details of each of the entities of interest after they have been identified without impacting the speed at which the graph database can be traversed. This is an improvement to the operation of the computer itself by making the computer return graph database results faster and allowing for faster visualization of the connections between entities and is an improvement to database technology by splitting data into two separate types of databases thereby allowing the graph database to scale better to larger sets of data.

Figure 1:
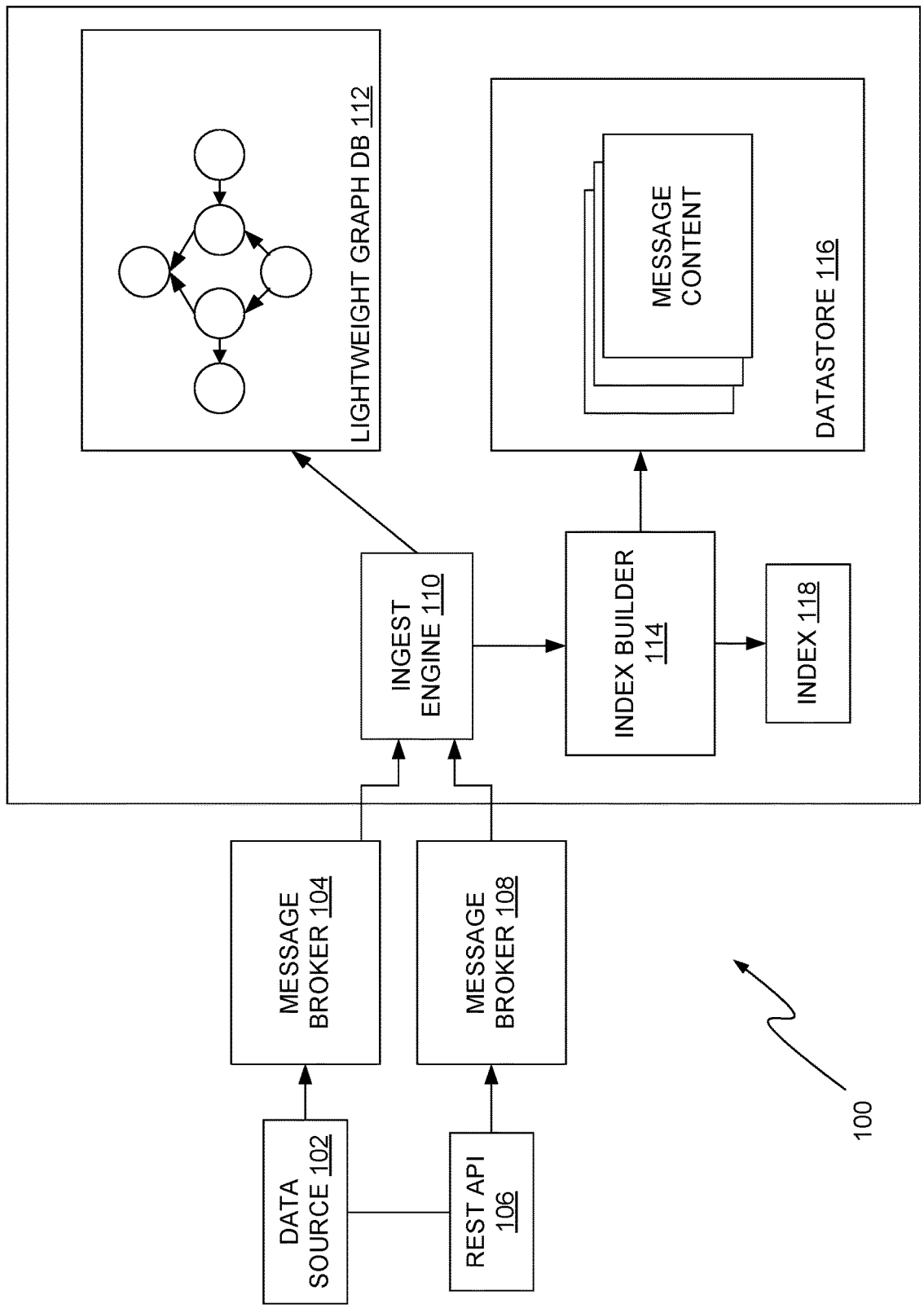
FIG. 1 is a block diagram of a system for receiving and processing data.

FIG. 1 provides a block diagram of a system 100 for receiving and processing incoming messages to create a lightweight graph database 112 and a datastore 116. Lightweight graph database 112 defines a collection of nodes and a collection of edges, with each edge connecting two nodes. Datastore 116 stores payloads found in the messages. In accordance with one embodiment, there are two types of messages that can be received: document messages and event messages. Document messages provide property values for one or more entities in a payload section of the message while event messages provide properties for an event in the payload section of the message. In these embodiments, lightweight graph database 112 includes four types of nodes: document, event, value and entity. A document node represents a document message, an event node represents an event message, a value node represents a value that uniquely identifies an entity, and an entity node represents an entity.

Figure 2:
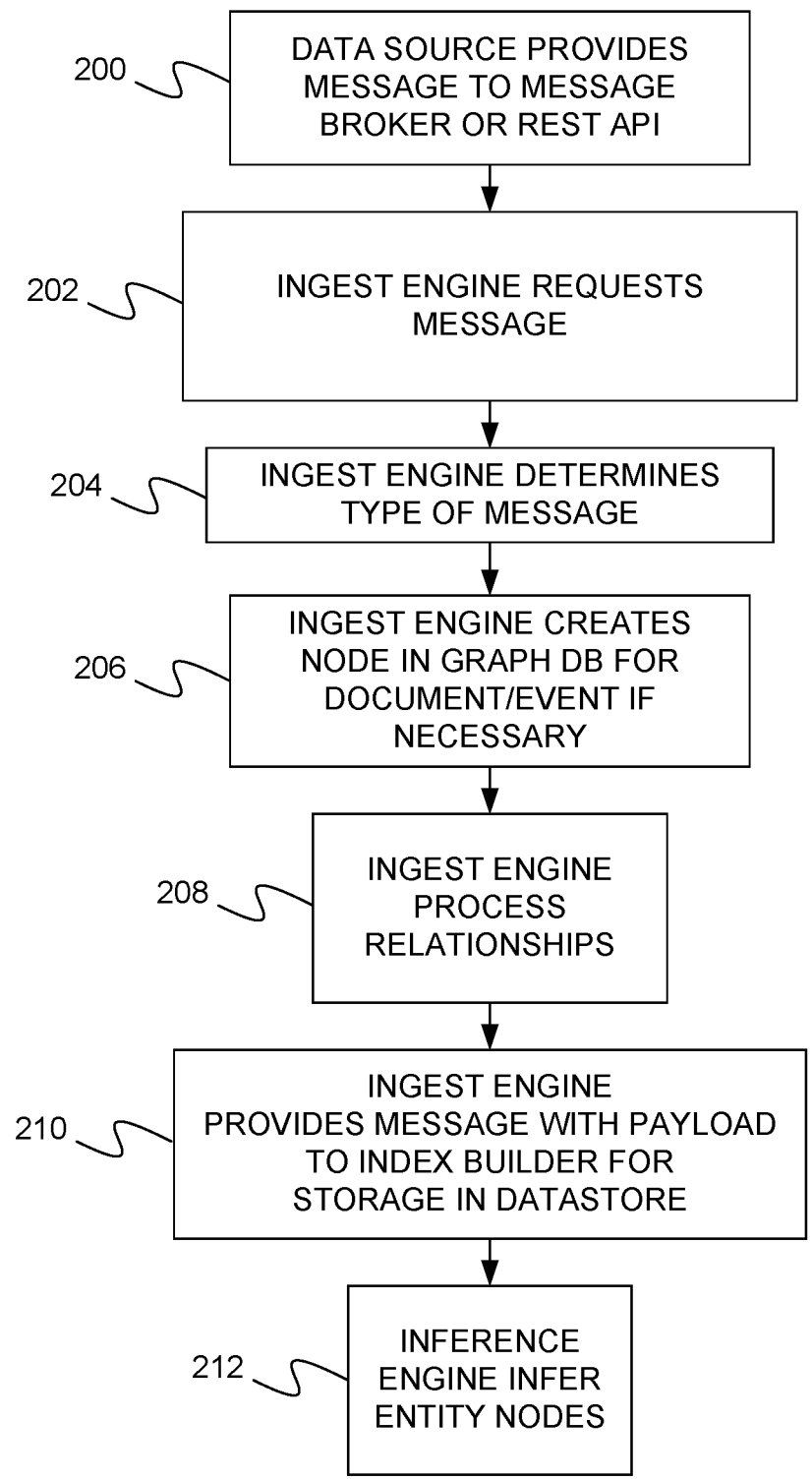
FIG. 2 is a flow diagram of a method of receiving and processing data.

FIG. 2 provides a flow diagram for processing document and event messages to create/update lightweight graph database 112 and to store payload data in datastore 116. In step 200 of FIG. 2, a datasource 102 provides a message either to a message broker 104 or a rest API 106. If the message is provided to rest API 106, rest API 106 forwards the message to a message broker 108. Examples of message brokers 104 and 108 include Kafka® from the Apache Software Foundation, which stores received messages in a queue and then provides the messages one-by-one to message consumers in response to requests from the consumers. Each request includes an index into the queue allowing the message consumer to sequentially request each message that has been provided by datasource 102.

Figure 4:
FIG. 4 is an example of an event message.

FIG. 3 provides an example document message 300 including a document payload and FIG. 4 provides an example of event message 400 providing an event payload. Document payloads and event payloads are provided in a data section such as data section 302 and data section 402 of messages 300 and 400, respectively. Messages 300 and 400 include a single unique identifier value or values that can be combined to construct a unique identifier value for the corresponding document or event. For example, in messages 300 and 400 a namespace 304/404, a class 306/406 and an ID 308/408 can be combined to provide the unique identifier. Note that different messages can have the same unique identifier because they refer to the same document or same event. When this occurs, the later received messages are considered to be later versions of the same document message or event message. Messages 300 and 400 also include a display name 310/410 that is displayed in user interfaces to represent the document or event. A type 312/412 is provided that identifies the message as either a document message or an event message. Document messages also include a state 314 that can be set to either "active" or "inactive" as described further below.

Document messages and event messages also include a relationship section 316/416 that provides an array of relationships with each relationship including a destination 318/418 and a type of relationship 320/420. In addition, an optional origin 322/422 can be provided in a relationship. If an origin is not provided, the origin is assumed to be the current message. Destinations 318/418 and origins 322/422 include a unique identifier or a collection of values that can be combined to construct a unique identifier, for the destination and origin, respectively. For example, namespace 324, class 326 and ID 328 of message 300 are combined to form a unique identifier for destination 318 and name space 424, class 426 and ID 428 of message 400 are combined to form a unique identifier for destination 418. Similarly, namespace 330, class 332 and ID 334 of message 300 are combined to form a unique identifier for origin 322 and namespace 430, class 432 and ID 434 of message 400 are combined to form a unique identifier for origin 422. Those skilled in the art will recognize that other techniques can be used to provide a unique identifier for each destination and origin in a message.

At step 202, ingest engine 110 requests a next message from either message broker 104 or message broker 108.

At step 204, ingest engine 110 determines the type of message that has been received using type 312/412.

At step 206, ingest engine 110 searches graph database 112 for a node that has the same unique identifier for the document or event as the message. A node for the document or event will already exist in graph database 112 if a previous message for the document or event has been received by ingest engine 110. If a matching node cannot be found, ingest engine 110 creates a new node for the document or event. Thus, either a document node or an event node is created depending on the type of message. A unique identifier for the node is set to the unique identifier of the document or event. As part of creating the node for the document or event, the display name property for the node is set to display name 310/410 of the message.

When creating the node for the document or event, the payload of the message is not stored within the node but instead is prevented from being added to graph database 112. This reduces the amount of information stored in graph database 112 making it possible for graph database 112 to handle larger numbers of messages and to provide faster search results for visualizing the relationships stored in graph database 112.

At step 208, ingest engine 110 processes relationships in the message that are found in relationship section 316/416 of the message.

Figure 5:
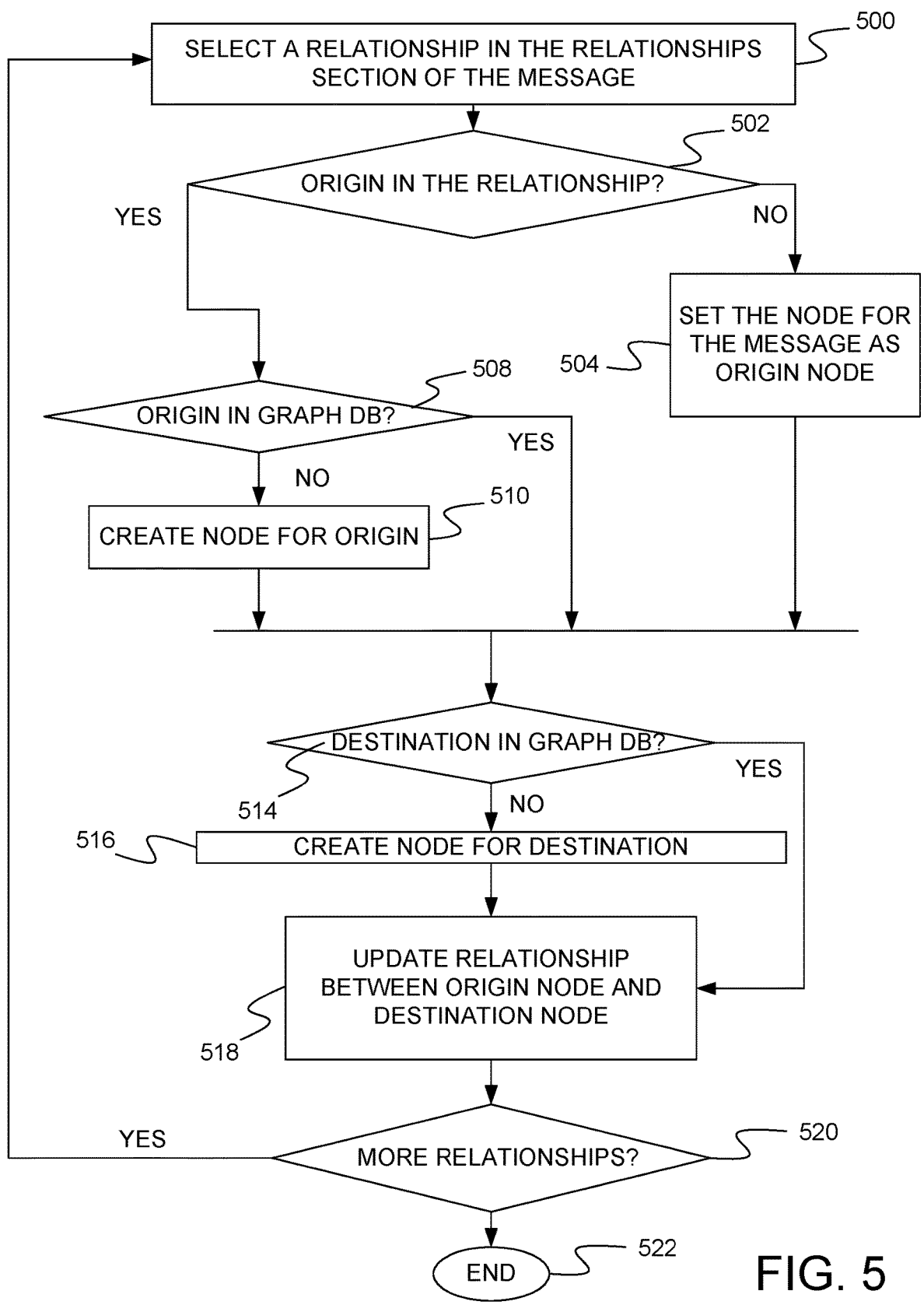
FIG. 5 is a flow diagram of a method of processing relationships in a message.

FIG. 5 provides a flow diagram of a method of processing the relationship in the message at step 208. At step 500 of FIG. 5, one of the relationships in the relationship array 316/416 is selected from the message. At step 502, ingest engine 110 determines if the relationship includes an origin 322/422. If there is no origin in the relationship, the node for the message that was created or found in step 206 is set as the origin node for this relationship at step 504.

At step 508, ingest engine 110 searches lightweight graph database 112 to determine if a node exists that has the unique identifier of the origin. If the node already exists, a node does not need to be created for the origin in graph database

112. However, if the unique identifier of the origin is not in the lightweight graph database 112 at step 508, a value node is created in graph database 112 for the origin at step 510. The unique identifier of the created node is set to the unique identifier of the origin.

After step 504 and step 510 and if a node did not need to be created for the origin at step 508, ingest engine 110 searches lightweight graph database 112 for the unique identifier of the destination at step 514. If a node is found in lightweight graph database 112 that has the unique identifier of the destination, a new node does not need to be created for the destination. However, if the unique identifier is not found in graph database 112, a node for the destination is created using the unique identifier of the destination at step 516. If the destination node already existed at step 514 or after it was created at step 516, a relationship between the origin node and the destination node is updated at step 518.

Figure 6:
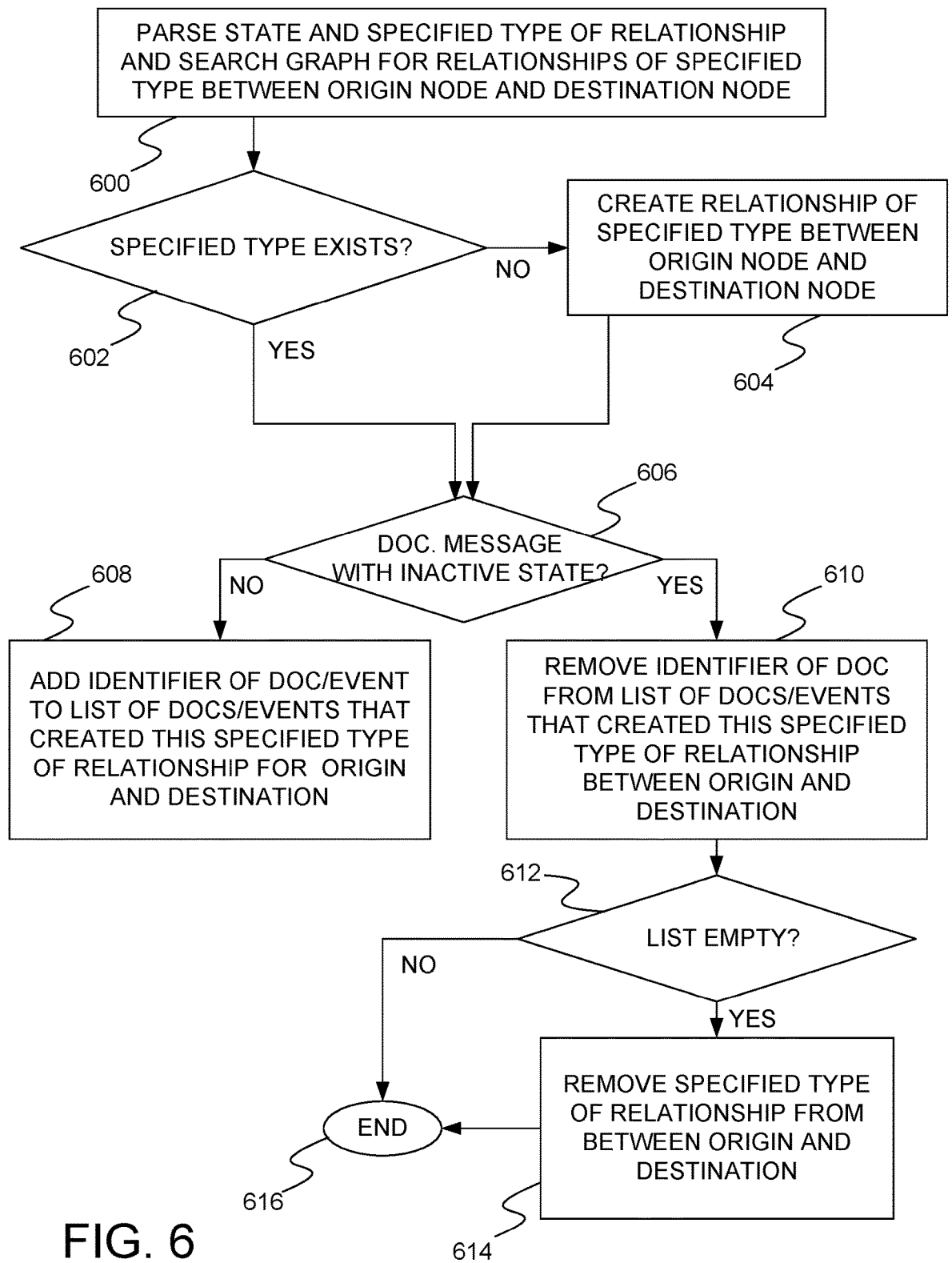
FIG. 6 is a flow diagram of a method of updating a relationship between nodes.

FIG. 6 provides a flow diagram of a method of updating the relationship between an origin node and a destination node depicted as step 518 in FIG. 5. In step 600, the relationship type 320/420 is parsed from the message and, if the message is a document message, the state 314 of the message is parsed from the message. Graph 112 is then searched to determine if a relationship of the specified type already exists between the origin node and the destination node. If a relationship of the specified type does not exist between the origin node and the destination node, ingest engine 110 adds a relationship of the specified type between the origin node and the destination node in lightweight graph database 112 at step 604.

In accordance with one embodiment, different messages can provide different types of relationships between any given pair of nodes. In addition, different messages can provide the same type of relationship between two nodes. Further, document messages can be used to convey that a specified type of relationship provided by a previous version of the document message should be removed. For example, if a first version of a document is received that provides a relationship of a specified type between two nodes, a second version of the document (having the same unique identifier as the first version) can indicate that the relationship with that specified type is no longer active. Note that this is only effective to remove a type of relationship set by a document having the same unique identifier. It does not affect relationships set by messages having different unique identifiers. For example, if a document message with a first unique identifier sets a relationship of a specified type between two nodes and a second message with a second unique identifier sets a relationship of the same specified type between the two nodes, a later document message having the first unique identifier can only deactivate the relationship of the specified type set by the earlier document message with the first unique identifier. The relationship of the specified type set by the message with the second unique identifier would continue to be active.

When a relationship of a specified type is created between two nodes in graph 112, a property is created for the relationship to keep track of which messages have set the specified type of relationship between the two nodes. In accordance with one embodiment, this property is an array or list of document or event unique identifiers corresponding to documents or events that set the specified type of relationship between the two nodes. When a message is received that sets the specified type of relationship between the two nodes, the unique identifier of the document or event of the message is added to the list if it is not already in the list. When a message is received that indicates that the relationship is no longer active, the unique identifier for the document or event of the message is removed from the list. These actions are shown as steps 606, 608 and 610 below.

Specifically, at step 606, ingest engine 112 determines whether the message is conveying that the relationship between the origin and destination is active or inactive. If the message is a document message with an "inactive" state 314, the message is conveying that, for the purposes of this document message, the relationship between the origin and destination is no longer active. If the current message is an event message or if the current message is a document message with an "active" state 314, the message is conveying that the relationship between the origin and the destination set in the message is currently active.

If the message is an event message or a document message with an "active" state 314 at step 606, the unique identifier of the document or event is added to the list for the specified type of relationship at step 608. Note that the unique identifier is only entered once in the list. Thus, if a message with the same unique identifier for a document or event is received multiple times, it is only added to the list for the specified type of relationship once.

If the message is a document message and state 314 is set to "inactive" at step 606, the relationship between the origin and the destination set in the message is considered to no longer be active for the purposes of the document. Based on this, the unique identifier for the document is removed from the list of unique identifiers for the specified type of relationship at step 610.

After the unique identifier of the document has been removed, the list of unique identifiers for the specified type of relationship is checked at step 612 to determine if it is empty. If the list is empty, the specified type of relationship is no longer considered active between the two nodes, and the specified type of relationship is removed from between the origin and destination nodes at step 614. By removing the specified type of relationship when no active documents provide the specified type of relationship, steps 612 and 614 reduce the size of the graph database thereby improving the performance of the computer system. If the list of messages is not empty at step 612 or after the specified type of relationship has been removed from between the origin and destination nodes at step 614, the process of FIG. 6 ends at step 616.

When the origin node is the node for the document or event, the creation of the relationship between the document/event node and the destination node allows the document/event node to be located from the destination node. As a result, when the destination node is located during a traversal of the graph, it is possible to follow the relationship from the destination node to the document/event node. Typically, this will be a "describes" relationship that indicates that the document/event node represents a document or event that describes the entity represented by the destination node. Using the unique identifier of the document/event node, a search of datastore 116 can then be performed to retrieve the payload of the corresponding message and thereby retrieve additional information about the entity represented by the destination node.

Returning to FIG. 5, after the relationship between the origin and destination node have been updated at step 518, ingest engine 110 determines if there are any other relationships in relationship array 316/416 of the message. If there is another relationship at step 520, ingest engine 110 returns to step 500 and selects the next relationship. When all of the relationships have been processed at step 520, the process of FIG. 5 ends at step 522.

Returning to FIG. 2, after ingest engine 110 has processed the relationships at step 208, ingest engine 110 provides the message to an index builder 114 that constructs an index 118 from the message before storing the entire message in a datastore 116 at step 210. Index 118 can be used by a searching engine to quickly search for messages that contain certain content and return those messages including the fully qualified name of the message node associated with each message. Ingest engine 110 provides the message to the index builder at step 210.

Figure 7:
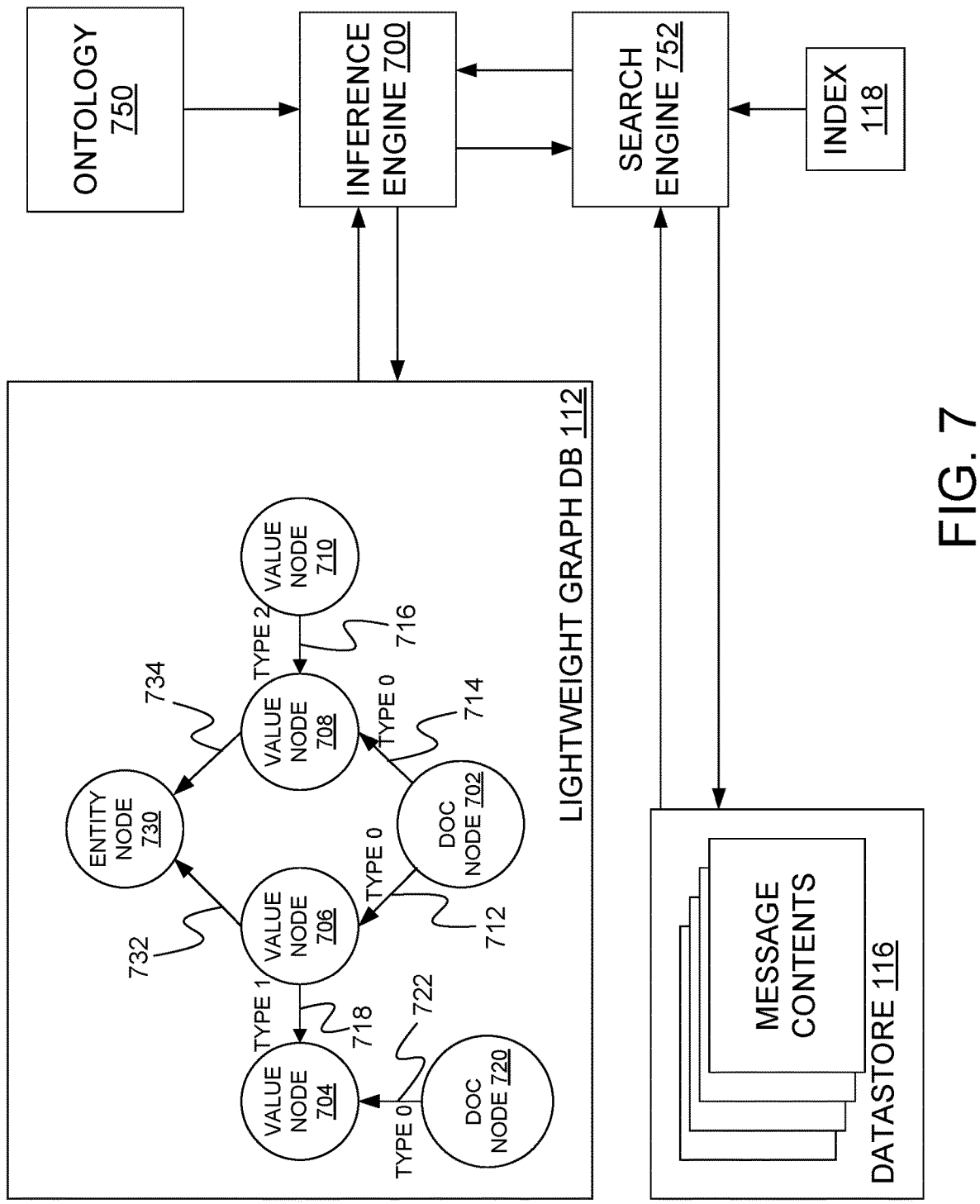
FIG. 7 is a block diagram of elements used to infer entities.
Figure 8:
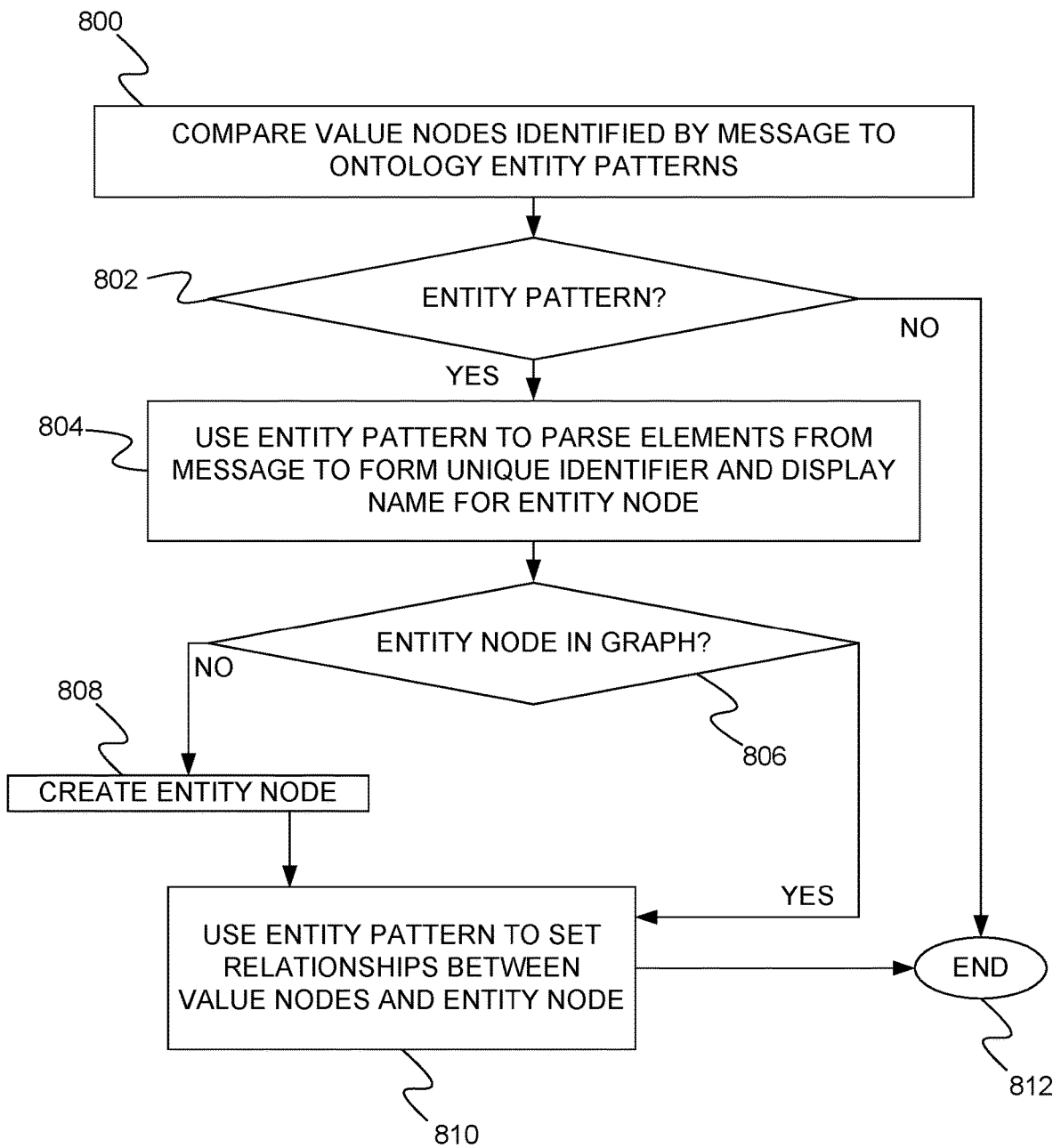
FIG. 8 is a flow diagram of a method of inferring entities.

After the ingest engine has stored the message in datastore 116, an inference engine 700 of FIG. 7 infers entity nodes at step 212 as depicted in the flow diagram of FIG. 8.

FIG. 7 shows a message node 702 that was created in lightweight graph database 112 for the current message at step 206 and value nodes 704, 706, 708 and 710 that represent origin or destination nodes provided in the message. Value nodes 706 and 708 are connected to message node 702 by relationship 712 and 714, respectively which each have a relationship type TYPE 0. In accordance with one embodiment, TYPE 0 indicates that value nodes 706 and 708 are defined by information in message node 702. Value node 710 is connected to value node 708 by a relationship 716 having a relationship type TYPE 2, that is provided in the message and value node 706 is connected to value node 704 by a relationship 718 having a relationship type of TYPE 1 that is provided in the message. Relationship 716 includes a list of unique identifiers for documents or events that created the TYPE 2 relationship type between nodes 708 and 710 and relationship 718 includes a list of unique identifiers for documents and events that created the TYPE 1 relationship type between nodes 706 and 704. Value node 704 is shown as being defined by message node 720 through relationship 722. Thus, value node 704 is provided by two different messages.

One or more value nodes may identify a particular person, place or thing, referred to generically as an entity. In step 800 of FIG. 8, inference engine 700 compares value nodes identified by the current message to entity patterns in ontology 750 to determine if the value nodes identify an entity. Such entity patterns indicate relationships between one or more valued nodes and an entity node that represents the entity as well as how a unique identifier for the entity node is to be derived and what the display name for the entity node should be. In accordance with one embodiment, the namespace and class of the value nodes are applied to the entity patterns to see if the namespaces and classes match any of the patterns. If the namespaces and classes of the value nodes match a pattern, inference engine 700 uses the entity pattern to parse elements from the message to form a unique identifier for the entity node and the display name for the entity node at step 804. In accordance with one embodiment, inference engine 700 first uses search engine 752 to locate the stored message in datastore 116. In particular, inference engine 700 uses the unique identifier of the document node 702 as the search criteria applied to search engine 752, which searches index 118 for the document associated with document node 702.

Using the unique identifier for the entity node, inference engine 700 searches lightweight graph database 112 to determine if the entity node is already in the graph at step 806. If the entity node is not in the graph at step 806, the entity node is created within lightweight graph database 112 at step 808 and is assigned the unique identifier. A display name property of the entity node is also set to the display name determined from the message. This results in an entity node 730 in FIG. 7. At step 810, the entity pattern is used by inference engine 700 to set relationships between one or more of the values nodes and the entity node. For example, in FIG. 7, relationship 732 between value node 706 and entity node 730 has been set and relationship 734 between value node 708 and 730 has been set. When there is no entity pattern at step 802 or after step 810, the process of FIG. 8 ends at step 812.

Figure 9:
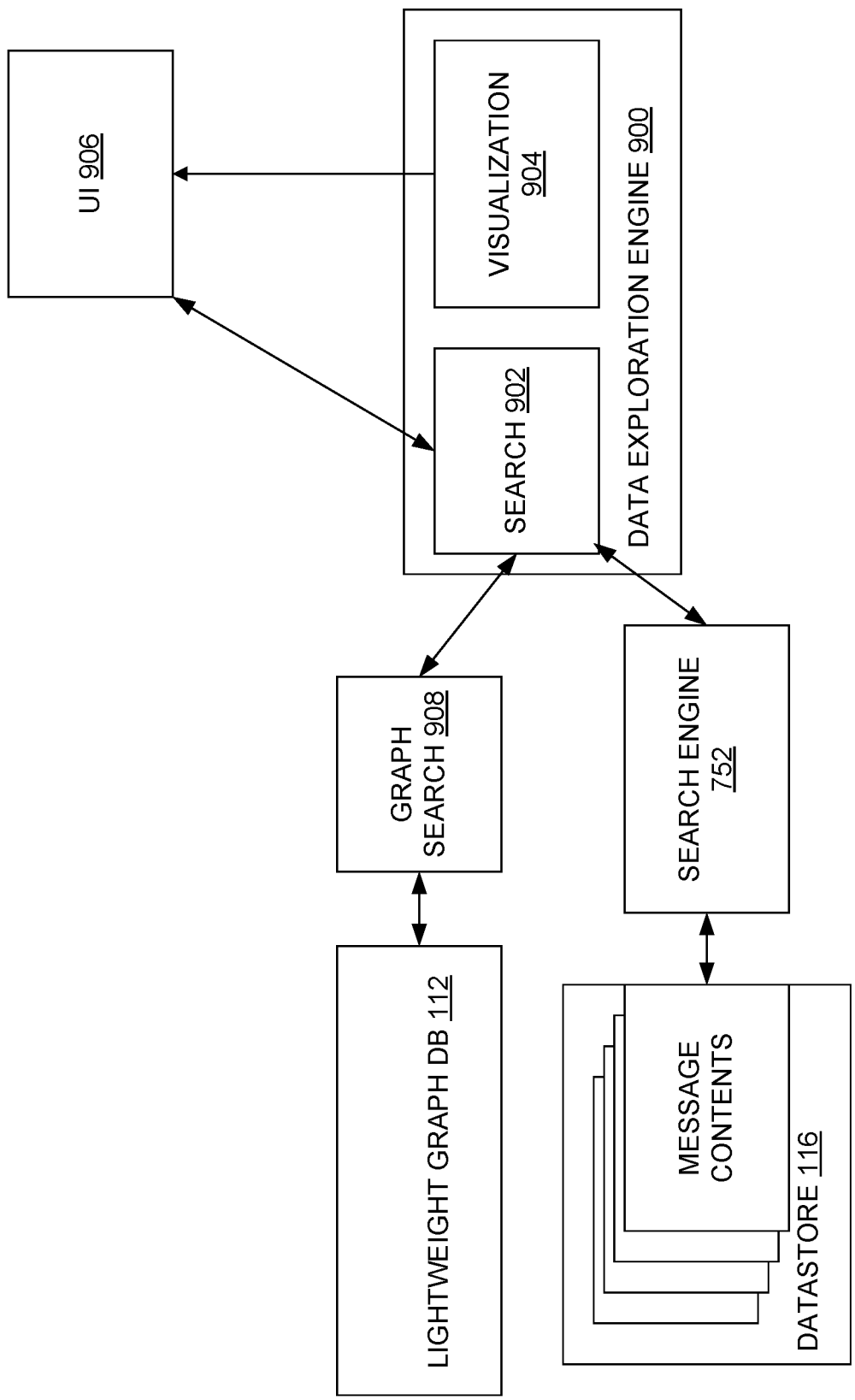
FIG. 9 is a block diagram of a system for exploring stored data.

The data stored in lightweight graph database 112 and datastore 116 can be explored using a data exploration engine 900 as shown in FIG. 9. Data exploration engine 900 includes a search module 902 and a visualization module 904 that together produce user interfaces 906.

Figure 10:
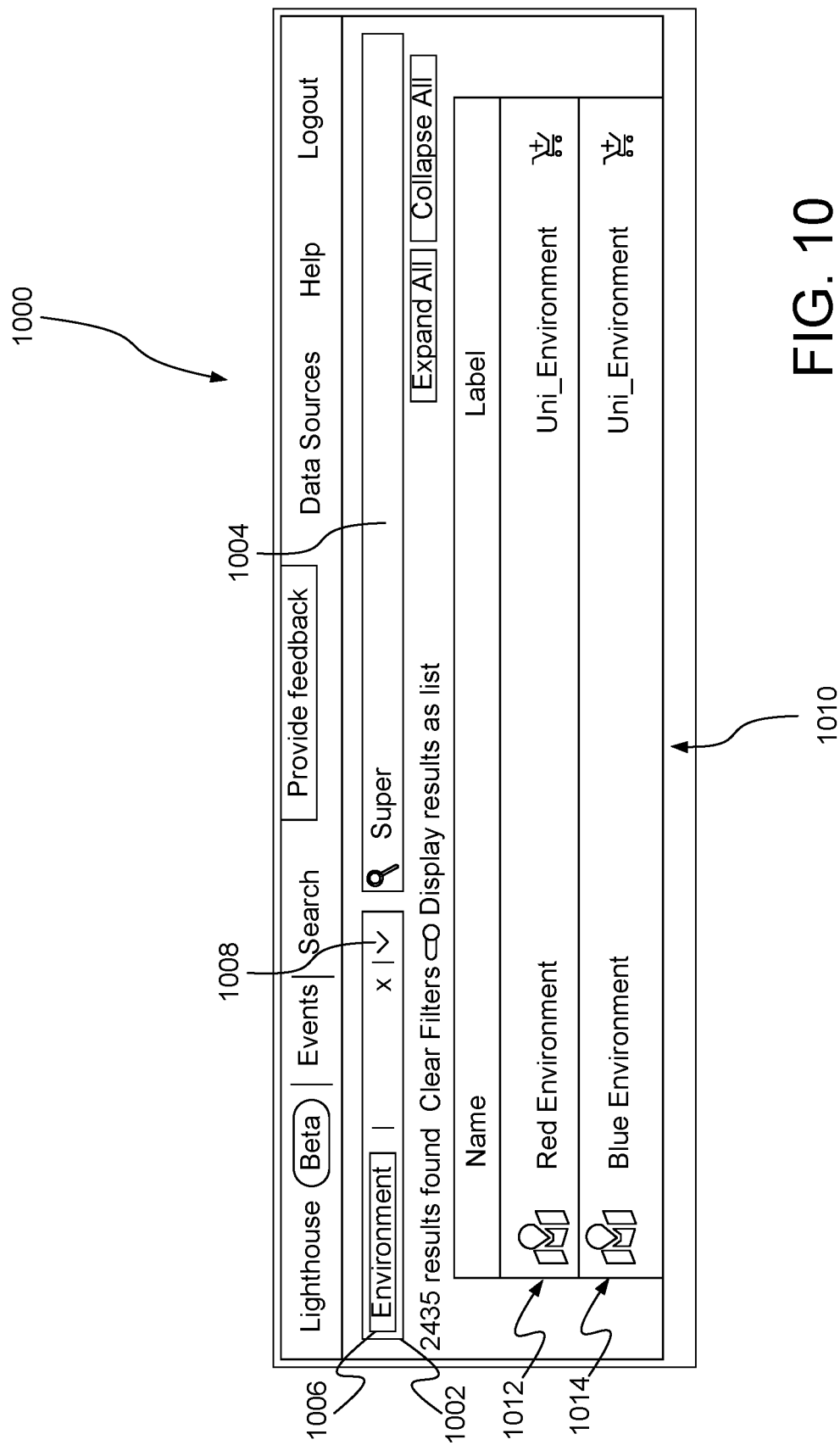
FIG. 10 is an example search user interface.

FIG. 10 provides an example of a user interface 1000 used to perform a search of messages in datastore 116. User interface 1000 includes a label selection box 1002 and a search term box 1004. Label selection box 1002 is used to select one or more labels or indices of value nodes using a pulldown 1008 to display the list of available labels. For example in FIG. 10, the environment label 1006 has been selected. Textbox 1004 receives freeform text from the user. In the example shown in FIG. 10, the word "SUPER" has been entered by the user.

Upon receiving the search criteria in boxes 1002 and 1004, search module 902 provides the search criteria to search engine 752, which then performs a search of datastore 116 for all matching messages. Data exploration engine 900 uses the returned messages to locate the corresponding message nodes in lightweight graph database 112 and the corresponding value nodes linked to those message nodes by a relationship. Data exploration engine 900 then finds the entity nodes linked to those value nodes. The display names for the matching entities and the label for the matching entities are returned by search 902 so as to be displayed in a search result list 1010 of user interface 906. For example, in FIG. 10, two entities 1012 and 1014 meet the search criteria and have respective display names of "red environment" and "blue environment".

Figure 11:
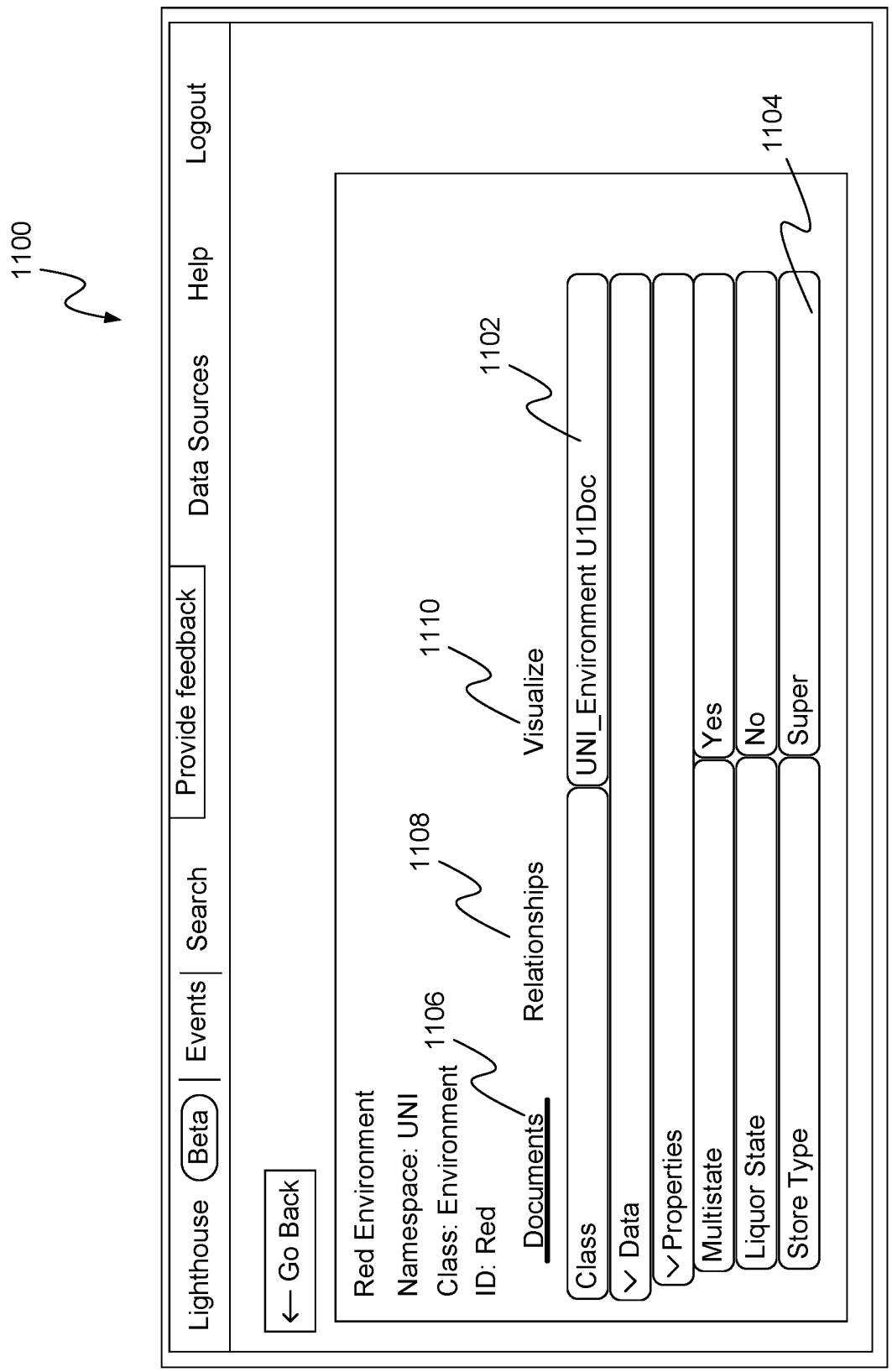
FIG. 11 is an example user interface showing contents of documents that define an entity.

Upon selection of one of the returned items in list 1010, data exploration engine 900 provides a user interface 1100 of FIG. 11. In user interface 1100, the contents of the message found by search engine 752 for the selected entry are displayed including the class of the message 1102 as well as the properties of the entity provided by the message. As shown in FIG. 11, one of the properties 1104 includes the value "super" which caused this message to be found during the search. The property "store types" associated with "super" is not stored in lightweight graph database 112 but instead is only found in datastore 116. By not including such properties within lightweight graph database 112, the traversal of lightweight graph database 112 is made faster and the memory required for lightweight graph database 112 is reduced. This allows the computer to operate faster when it is generating a visualization of the relationships between entities in graph database 112.

Figure 12:
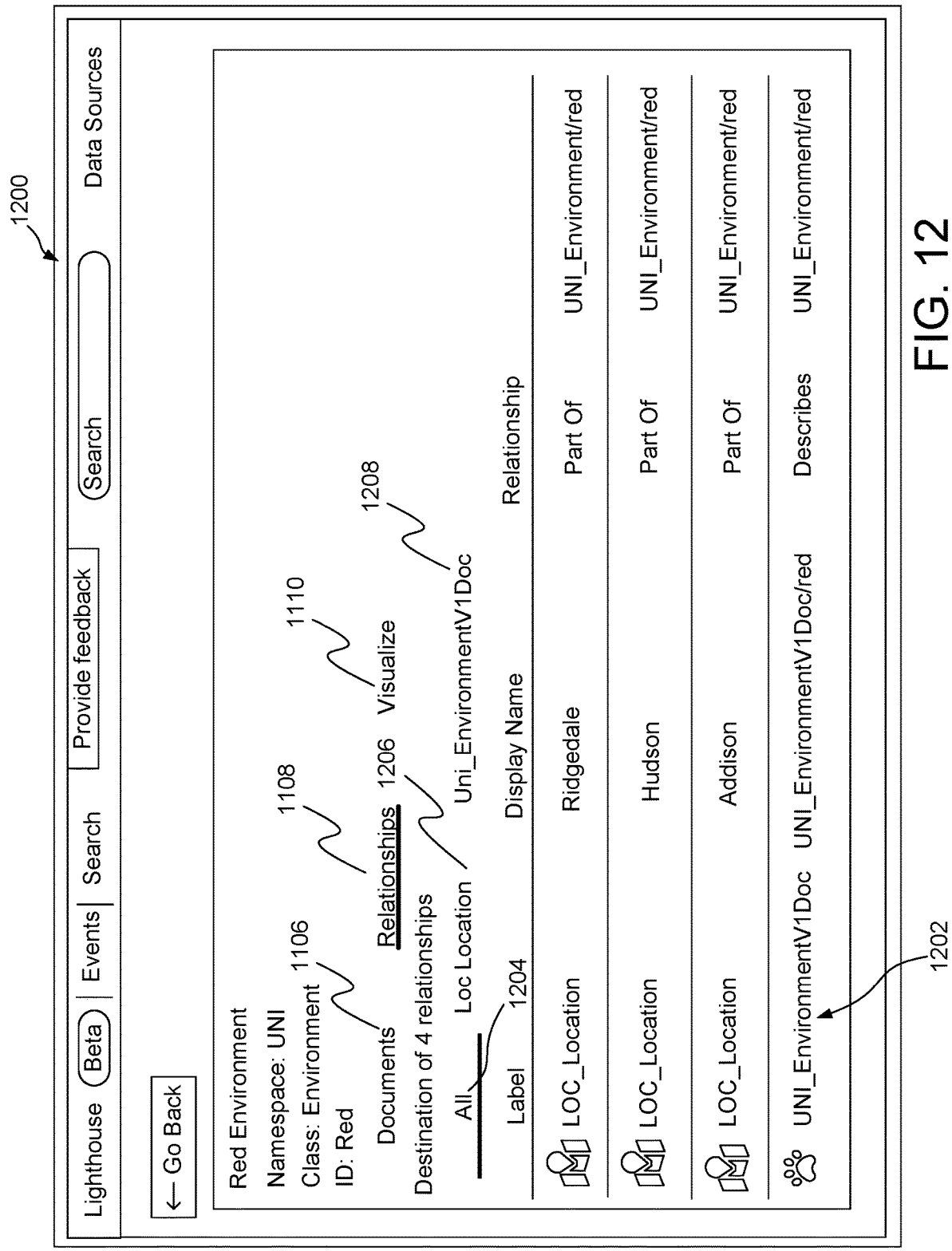
FIG. 12 is an example user interface showing a list of entities related to a selected entity.

User interface 1100 also includes tabs 1106, 1108 and 1110. Initially, tab 1106 is selected to show documents that define properties for the selected item as shown in FIG. 11. When tab 1108 is selected, search 902 performs a fast search of graph database 112 to locate all entities that are in a relationship with the selected entity. Because the graph database 112 does not include all of the content of the messages, the computer is able to perform this search faster than if the entire content of every message was included in graph database 112. When the search is complete, user interface 1200 of FIG. 12 is displayed, which provides a list of entities 1202 that are related to the selected entity in graph database 112. Tabs 1204, 1206 and 1208 can be used to filter list 1202. When tab 1204 is selected, all of the entities are returned. When tabs 1206 or 1208 are selected, only the entities that fall within the class associated with those tabs are displayed. Thus, when tab 1206 is selected, only the entities in the "location" class are displayed. When tab 1208 is selected, only the entities in "Uni Environment V1 Doc" class are displayed in list 1202.

Figure 13:
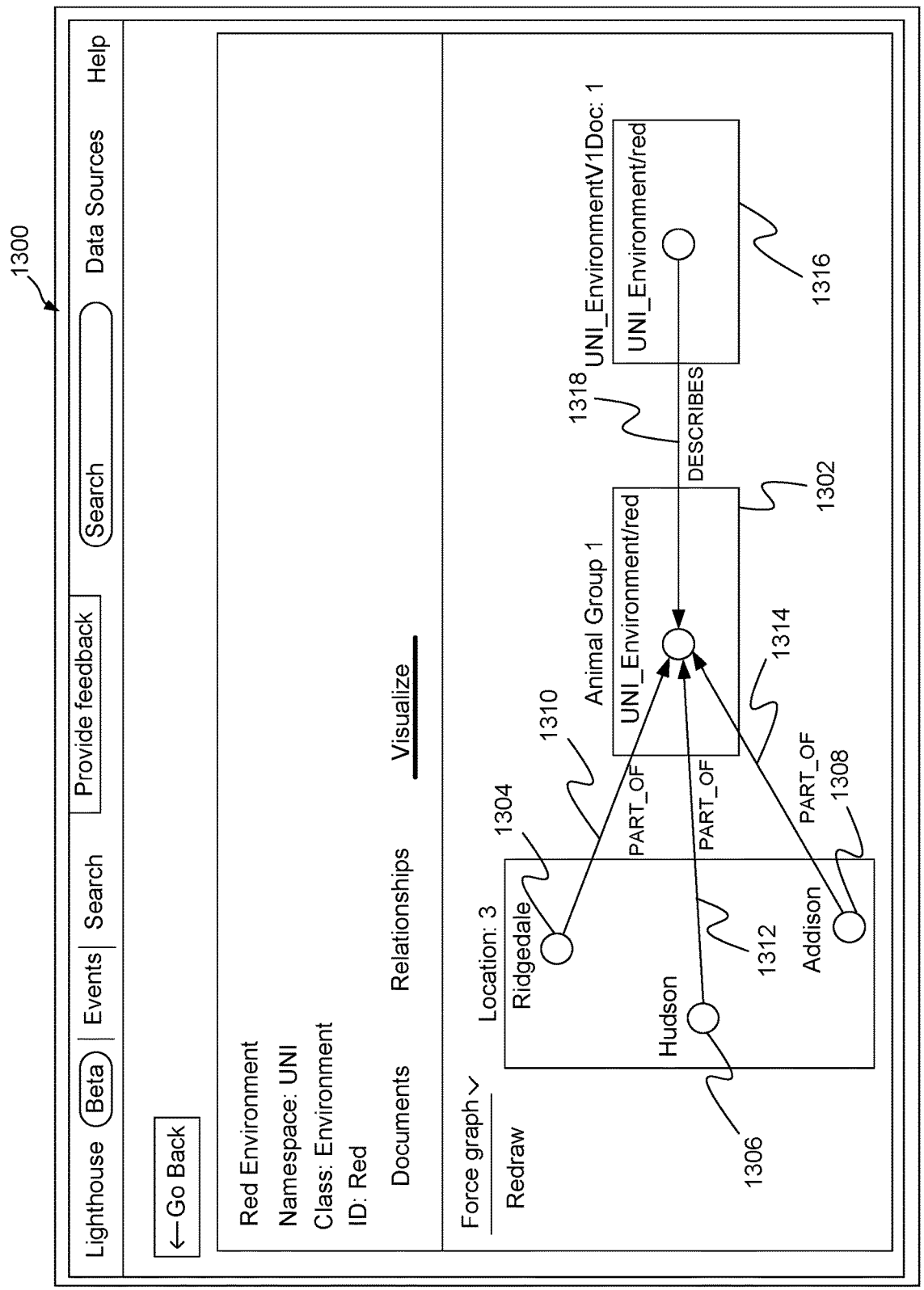
FIG. 13 is an example user interface showing a visualization of the relationships between entities.

When tab 1110 is selected, visualization module 904 of data exploration engine 900 generates a visualization of the relationships between the entities in list 1202 and the selected entity. FIG. 13 provides an example of a user interface 1300 showing such a visualization. In FIG. 13, the selected entity is shown as box 1302. Three location entities 1304, 1306 and 1308 are shown with respective "part_of" relationships 1310, 1312 and 1314 to entity 1302. The message node 1316 that defines entity 1302 is connected to entity 1302 by a "describes" relationship 1318. Visualization 904 constructs the visualization as shown in FIG. 13 from the relationships returned by lightweight graph database 112 based on graph search 908, which requests all entities related to the selected entity within lightweight graph database 112.

Figure 14:
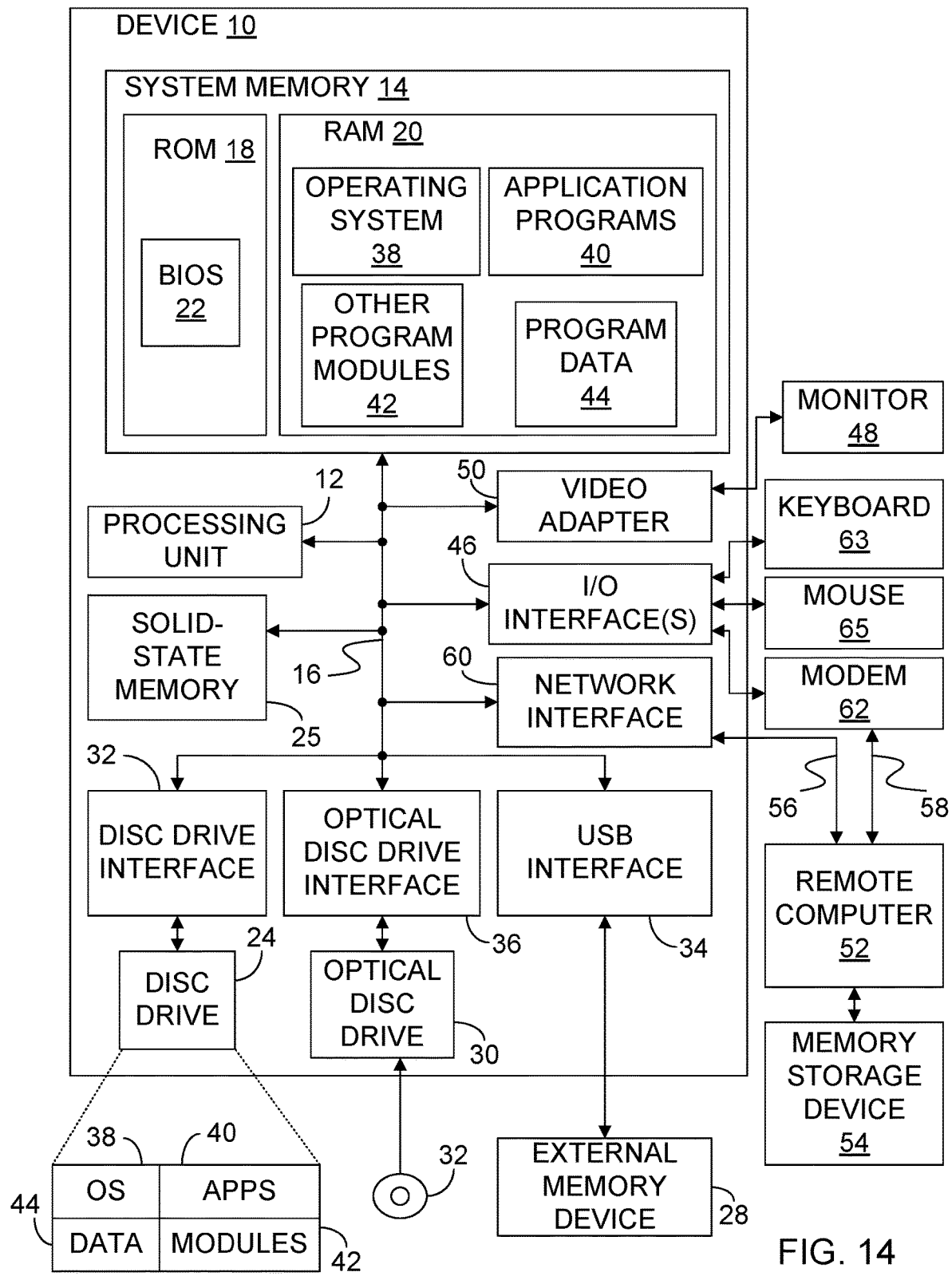
FIG. 14 is a block diagram of an exemplary computer on which embodiments are executed.

Ingest engine 110, index builder 114, lightweight graph database 112, datastore 116, inference engine 700, search engine 752, data exploration engine 900, graph search 908 and user interface 906 are implemented on one or more computing devices, an example of which is shown in FIG. 14. Computing device 10 of FIG. 14 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Computing device 10 further includes an optional hard disc drive 24, an optional external memory device 28, and an optional optical disc drive 30. External memory device 28 can include an external disc drive or solid-state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of the applications discussed above. Program data 44 may include any data used by the systems and methods discussed above.

Processing unit 12, also referred to as a processor, executes programs in system memory 14 and solid-state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 14. The network connections depicted in FIG. 14 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 14 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
receiving a message comprising an origin, a destination and a specified type for a relationship between the origin and the destination, the message further comprising a payload and a document unique identifier, the message received from a source other than a searchable datastore;
using the message to locate a first node in a graph database for the origin;
using the message to locate a second node in the graph database for the destination;
using the message to locate a relationship of the specified type between the first node and the second node in the graph database;
removing the document unique identifier from a list of other document unique identifiers maintained for the relationship of the specified type between the first node and the second node, wherein each document unique identifier in the list of document unique identifiers is associated with a respective message that included the origin, the destination and the specified type for the relationship between the origin and the destination; and determining that the list of document unique identifiers is empty and in response removing the relationship of the specified type from between the first node and the second node to reduce the size of the graph database.

2. The computer-implemented method of claim 1 wherein the message further comprises a state indicating that the relationship is inactive.

3. The computer-implemented method of claim 1 wherein the message further comprises a second destination and the method further comprises:

creating a third node in a graph database for the second destination;

determining that the second node identifies an entity;

creating an entity node in the graph database for the entity and setting a relationship between the entity node and the second node and a relationship between the entity node and the third node.

4. A computer-implemented method comprising:

receiving a message comprising a relationship, a state and a payload, the relationship having a relationship type, an origin and a destination, the payload providing data related to one of a document and an event;

determining whether the state is active or inactive;

when the state is active, modifying a graph database as necessary such that the graph database includes a node for the origin, a node for the destination, and a relationship between the node for the origin and the node for the destination having the relationship type specified in the message and such that a list associated with the relationship type between the node for the origin and the node for the destination includes a unique identifier for the at least one of the document and event;

in response to the state being inactive, removing the unique identifier for the at least one of the document and event from the list and determining whether the list is empty;

in response to determining the list is empty, removing the relationship of the relationship type from between the node for the origin and the node for the destination and thereby reducing a size of the graph database.

5. The computer-implemented method of claim 4 wherein the message comprises at least one element for forming the unique identifier for the document or event.

6. The computer-implemented method of claim 4 further comprising:

determining that a first node in the graph database identifies an entity and in response creating an entity node in the graph database and setting a first relationship between the entity node and the first node; and determining that a second node in the graph database identifies the entity and setting a second relationship between the entity node and the second node.

7. The computer-implemented method of claim 4 further comprising storing contents of the message in a datastore such that the contents are searchable while preventing the contents of the message from being stored in the graph database.

8. A system comprising:

a memory containing a lightweight graph database having nodes and relationships between nodes, the nodes comprising:

a node representing a document described in a message, the message having at least one element that provides a unique identifier for the document, an origin, a destination, an explicit relationship type between the origin and the destination, and a payload, wherein the node was created from the message and wherein the payload of the message is excluded from the lightweight graph database;

a node representing the destination in the message;

a node representing the origin in the message;

a relationship having the explicit relationship type between the node representing the origin and the node representing the destination;

a list of unique identifiers for documents, wherein the relationship having explicit relationship type between the node representing the origin and the node representing the destination is dependent on the list such that in response to all of the unique identifiers for documents being removed from the list, the relationship having the explicit relationship type between the node representing the origin and the node representing the destination is removed from the lightweight graph database so as to reduce the size of the lightweight graph database; and a relationship between the node representing the document and the node representing the destination; and a datastore containing the message including the payload.

9. The system of claim 8 wherein when a second message containing the at least one element that provides the unique identifier for the document is received and the second message contains an inactive state:

the unique identifier for the document is removed from the list of documents that provided the relationship of the explicit type between the node representing the origin and the node representing the destination.

10. The system of claim 8 wherein the graph database further comprises:

a node representing a second destination in the message and an entity node, wherein the node representing the destination and the node representing the second destination each uniquely identify a same entity;

a relationship of a second explicit type between the node representing the destination and the entity node; and a relationship of the second explicit type between the node representing the second destination and the entity node.

\* \* \* \* \*